(12) United States Patent
Hess et al.

(10) Patent No.: US 9,593,771 B2
(45) Date of Patent: Mar. 14, 2017

(54) METHOD FOR OPERATING AN AUTOMATIC TRANSMISSION

(71) Applicant: ZF Friedrichshafen AG, Friedrichshafen (DE)

(72) Inventors: Christoph Hess, Eriskirch (DE); Philipp Kölbl, Friedrichshafen (DE); Ruben Cueppers, Wangen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 261 days.

(21) Appl. No.: 14/512,513

(22) Filed: Oct. 13, 2014

(65) Prior Publication Data

US 2016/0102760 A1    Apr. 14, 2016

(51) Int. Cl.
| | |
|---|---|
| F16H 61/30 | (2006.01) |
| F16H 61/686 | (2006.01) |
| F16H 3/66 | (2006.01) |
| F16H 61/28 | (2006.01) |
| F16H 3/44 | (2006.01) |

(52) U.S. Cl.
CPC ............... *F16H 61/30* (2013.01); *F16H 3/66* (2013.01); *F16H 61/686* (2013.01); *F16H 2003/442* (2013.01); *F16H 2061/2823* (2013.01); *F16H 2061/2853* (2013.01); *F16H 2200/006* (2013.01); *F16H 2200/0065* (2013.01); *F16H 2200/2012* (2013.01); *F16H 2200/2046* (2013.01); *F16H 2200/2094* (2013.01)

(58) Field of Classification Search
None
See application file for complete search history.

(56) References Cited

U.S. PATENT DOCUMENTS

| | | | | |
|---|---|---|---|---|
| 5,542,887 A | * | 8/1996 | Tsukamoto | F16H 61/20 475/63 |
| 5,733,220 A | * | 3/1998 | Iizuka | F16H 61/061 477/116 |
| 5,957,808 A | * | 9/1999 | Iizuka | F16H 61/20 477/116 |
| 6,317,671 B1 | * | 11/2001 | Tsutsui | F16H 61/20 477/109 |

* cited by examiner

*Primary Examiner* — Edwin A Young
(74) *Attorney, Agent, or Firm* — Dority & Manning, P.A.

(57) ABSTRACT

A method for operating an automatic transmission is provided. The method includes disengaging a shifting element of the automatic transmission and measuring an input speed of the automatic transmission while the shifting element is disengaging. A command pressure of the shifting element is adjusted to a target command pressure based at least in part on the input speed of the automatic transmission while the shifting element is disengaging.

19 Claims, 3 Drawing Sheets

| | A | B | C | D | E | F |
|---|---|---|---|---|---|---|
| "1" | X | | | X | | X |
| "2" | X | | X | | | X |
| "3" | X | X | | | | X |
| "4" | X | | | | X | X |
| "5" | X | X | | | X | |
| "6" | X | | X | | X | |
| "7" | X | | | X | X | |
| "8" | | | X | X | X | |
| "9" | | X | | X | X | |
| "R" | | X | | X | | X |

METHOD FOR OPERATING AN AUTOMATIC TRANSMISSION

FIELD OF THE INVENTION

The present subject matter relates generally to automatic transmissions, such as nine-speed automatic transmissions.

BACKGROUND OF THE INVENTION

Automatic transmissions generally include at least one planetary gear set and a plurality of shift elements. The shift elements selectively engage components of the planetary gear sets in order to hinder or prevent rotation of the components. Selective actuation of the shift elements adjusts the gear ratio of the automatic transmission and shifts the automatic transmission between its various gears.

The automatic transmission may shift between its various gears and deliver power to wheels of an associated vehicle as the associated vehicle is driven. When the associated vehicle is stopped, such power delivery may be interrupted or terminated by taking the automatic transmission out of gear. For example, the automatic transmission is generally taken out of gear when a shift lever of the associated vehicle is positioned in neutral or park. To take the automatic transmission out of gear, all of the automatic transmission's shift elements are generally opened or disengaged.

Smoothly and uniformly opening the shift elements can improve gear disengagement of the automatic transmission. However, various factors can impede uniform opening of the shift elements. For example, friction shift elements wear over time, and such wear can affect performance and reaction of the friction shift elements. As another example, tolerance stacking of shifting element components can make providing uniform performance between automatic transmissions difficult.

Accordingly, a method for operating a transmission that includes steps for providing uniform and/or consistent disengagement of shifting elements of the automatic transmission would be useful. In particular, a method for operating a transmission that includes steps for providing uniform and/or consistent disengagement of shifting elements of the automatic transmission during gear disengagements of the automatic transmission would be useful.

BRIEF DESCRIPTION OF THE INVENTION

The present subject matter provides a method for operating an automatic transmission. The method includes disengaging a shifting element of the automatic transmission and measuring an input speed of the automatic transmission while the shifting element is disengaging. A command pressure of the shifting element is adjusted to a target command pressure based at least in part on the input speed of the automatic transmission. Additional aspects and advantages of the invention will be set forth in part in the following description, or may be apparent from the description, or may be learned through practice of the invention.

In a first exemplary embodiment, a method for operating an automatic transmission is provided. The method includes adjusting a shift lever to a neutral position or a park position, commanding a shifting element of the automatic transmission to actuate from an engaged configuration to a disengaged configuration, measuring an input speed of the automatic transmission, establishing a launch time for a turbine of a torque converter of the automatic transmission based at least in part on when the input speed of the automatic transmission exceeds zero at the step of measuring, and changing a command pressure to the shifting element of the automatic transmission based at least in part on the launch time for the turbine of the torque converter from the step of establishing.

In a second exemplary embodiment, a method for operating an automatic transmission is provided. The method includes disengaging a shifting element of the automatic transmission after a shift lever is adjusted to a neutral position or a park position, measuring a turbine speed of a torque converter of the automatic transmission during the step of disengaging, and adjusting a command pressure supplied to the shifting element of the automatic transmission based at least in part on a launch time of a turbine of the torque converter. The launch time corresponds to a time when the turbine speed exceeds zero during the step of measuring.

In a third exemplary embodiment, a method for operating an automatic transmission is provided. The method includes adjusting a shift lever to a neutral position or a park position, actuating a shifting element of the automatic transmission from an engaged configuration to a disengaged configuration after the step of adjusting, and measuring an input speed of the automatic transmission. The method also includes step for adjusting a command pressure of the shifting element to a target command pressure based at least in part on the input speed of the automatic transmission.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figures 1, 2:
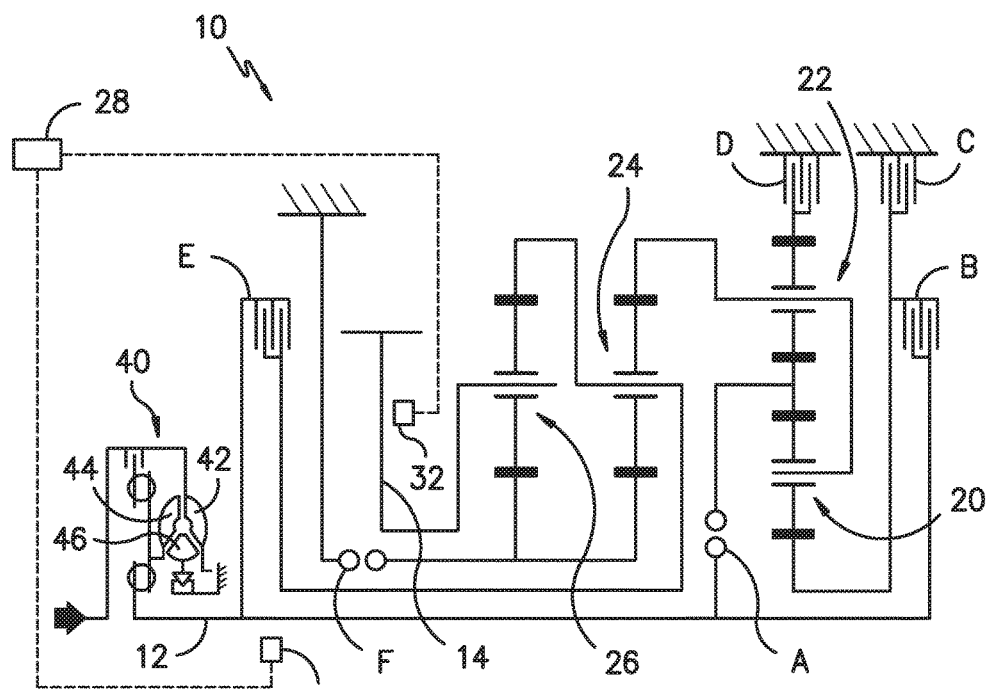
FIG. 1 provides a schematic view of an automatic transmission according to an exemplary embodiment of the present subject matter.
FIG. 2 illustrates a table of an exemplary shifting scheme as may be used with the exemplary automatic transmission of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an exemplary embodiment of the present subject matter. Automatic transmission 10 may be constructed or arranged in a similar manner to the automatic transmission described in U.S. Pat. No. 8,398,522 to Bauknecht et al., which is hereby incorporated by reference for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10, as will be understood by those skilled in the art, in order to provide a suitable mechanical advantage to propel the associated vehicle.

As may be seen in FIG. 1, automatic transmission 10 includes an input shaft 12 and an output shaft 14. Automatic transmission 10 also includes a torque converter 40 with an impeller 42, a turbine 44 and a stator 46. Torque converter 40 may couple automatic transmission 10 to a motor of an associated vehicle. In particular, input shaft 12 may be coupled to turbine 44 of torque converter 40, and the motor may rotate impeller 42 relative to turbine 44 in order to urge or induce rotation of turbine 44 with oil flow between impeller 42 and turbine 44. In such a manner, torque converter 40 may couple an engine to automatic transmission 10 such that input shaft 12 is rotatable with the motor. Stator 46 may redirect oil flow from turbine 44 towards impeller 42 in order to improve performance of torque converter 40, as will be understood by those skilled in the art. Torque converter 40 may also include a one-way clutch to further improve performance of torque converter 40. Output shaft 14 may be coupled a front axle drive shaft of the associated vehicle. Automatic transmission 10 may change gears in order to adjust the gear ratio between the motor and front axle drive shaft of the associated vehicle, as will be understood by those skilled in the art.

Automatic transmission 10 also includes four planetary gear sets: a first planetary gear set 20; a second planetary gear set 22; a third planetary gear set 24 and a fourth planetary gear set 26. In certain exemplary embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the exemplary embodiment of FIG. 1, the non-positive shifting elements includes a multidisc clutch B, a multidisc brake C, a multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the exemplary embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples a transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Electronic control unit 28 may be mounted on an exterior of transmission housing 16. Electronic control unit 28 is in operative communication with solenoid valves of the shifting elements of automatic transmission 10. Thus, electronic control unit 28 may selectively adjust the shifting elements between the engaged configuration and the disengaged configuration, e.g., by selectively opening and closing the associated solenoid valves of the shifting elements. In such a manner, electronic control unit 28 may shift automatic transmission 10 between gears during operation of automatic transmission 10, e.g., based at least in part on signals from input speed sensor 30 and output speed sensor 32, as will be understood by those skilled in the art.

Input speed sensor 30 is configured for measuring a speed, e.g., rotations per minute (RPM), of input shaft 12. Input speed sensor 30 may be positioned adjacent input shaft 12 or impeller 44 of torque converter 40. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an exemplary shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and blank cells indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake D and multidisc clutch E are in the disengaged configuration in second gear. In the fourth gear, dog clutch A, multidisc clutch E and dog clutch F are in the engaged configuration. It should be understood that in certain exemplary embodiments, dog clutch A need not be in the engaged configuration to operate automatic transmission 10 in fourth gear. Thus, multidisc clutch E and dog clutch F may be the only shifting elements of automatic transmission 10 in the engaged configuration to operate automatic transmission 10 in fourth gear, in certain exemplary embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, eight forward gears, etc.

Figure 3:
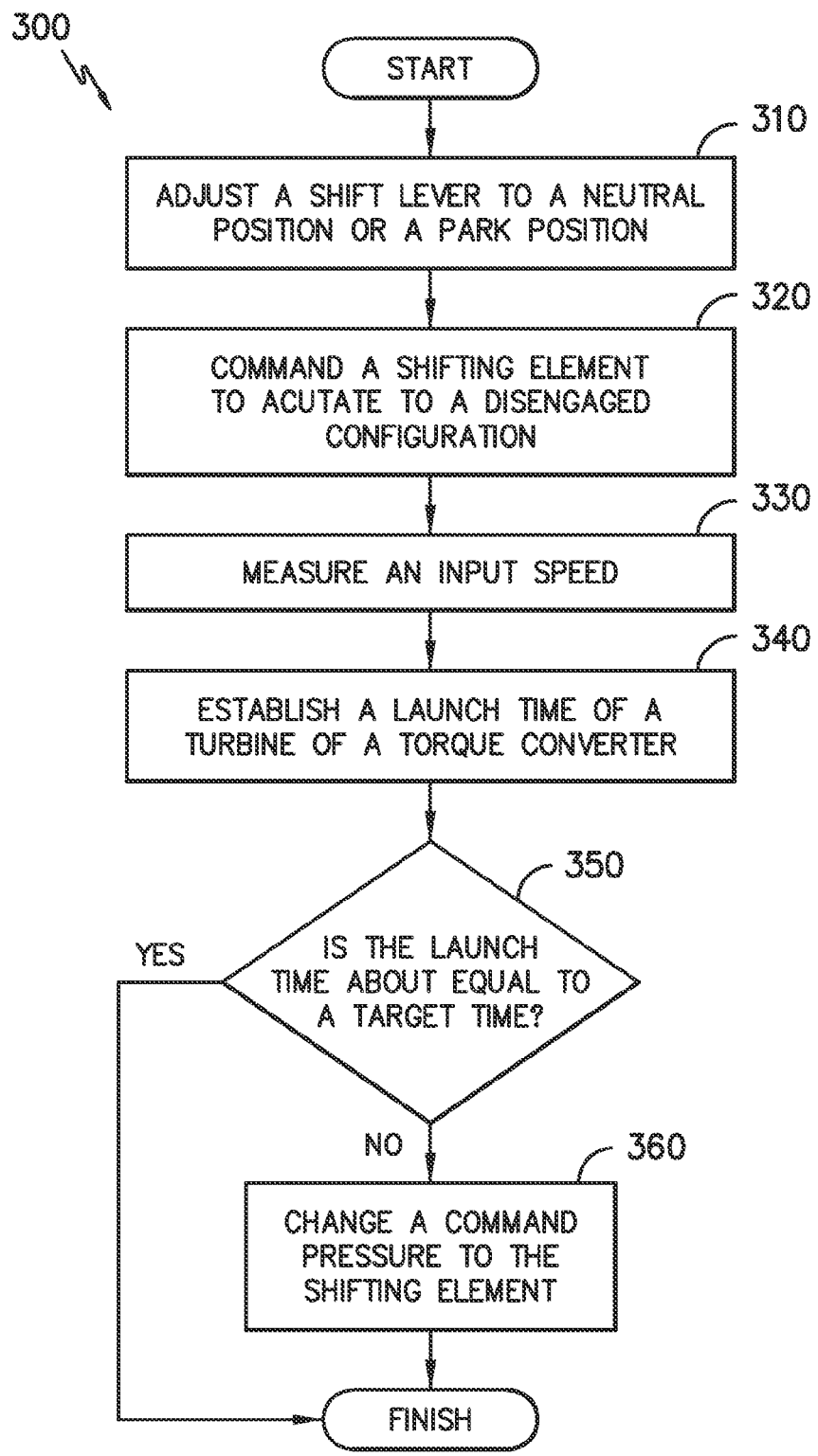
FIG. 3 illustrates a method for operating an automatic transmission according to an exemplary embodiment of the present subject matter.

FIG. 3 illustrates a method 300 for operating an automatic transmission according to an exemplary embodiment of the present subject matter. Method 300 may be used in or with any suitable transmission. For example, method 300 may be used with automatic transmission 10 (FIG. 1). The electronic control unit 28 of automatic transmission 10 may be programmed or configured to implement method 300. Utilizing method 300, performance of a shifting element of automatic transmission 10 may be improved or enhanced, e.g., by providing uniform or consistent disengagement of the shifting element.

Figure 4:
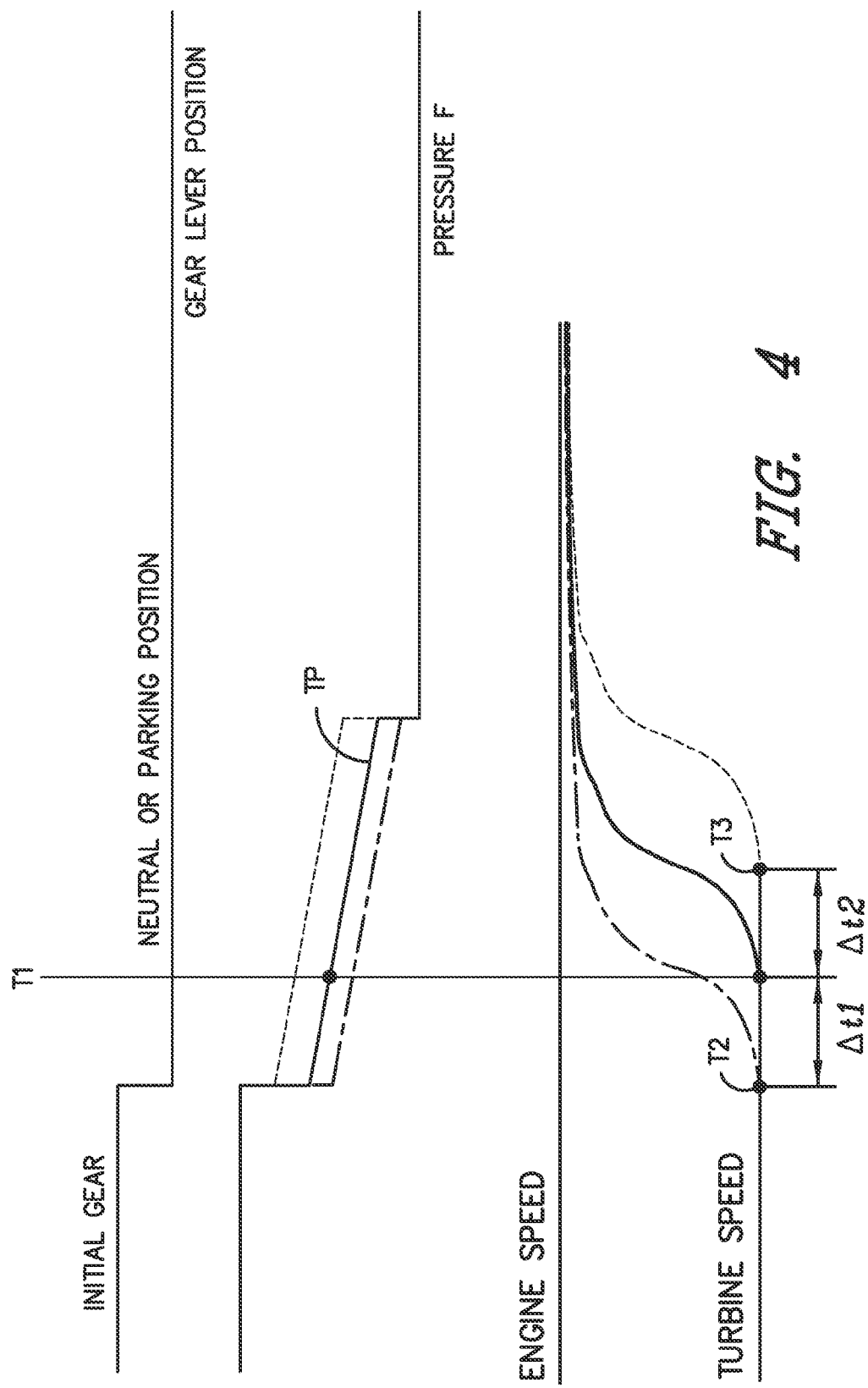
FIG. 4 illustrates a plot of shifting element disengagement pressure versus time for the exemplary automatic transmission of FIG. 1 during the exemplary method of FIG. 3.

FIG. 4 illustrates a plot of shifting element disengagement pressure versus time for automatic transmission 10 during method 300. Method 300 is described in greater detail below with reference to FIG. 4. In FIG. 4, the line labeled "pressure F" corresponds to a command line pressure supplied to dog clutch F, e.g., via the solenoid valve of dog clutch F. Electronic control unit 28 may selectively adjust the pressure supplied dog clutch F, as shown in FIG. 4. The line labeled "gear lever position" corresponds to a position of a shift lever associated with automatic transmission 10. The upper position corresponds to a position of the shift lever where automatic transmission 10 is delivering power to output shaft 14, e.g., when the shift lever is positioned in D (drive) position or the R (reverse) position. The lower position corresponds to a position of the shift lever where automatic transmission 10 is not delivering power to output shaft 14, e.g., when the shift lever is positioned in N (neutral) position or the P (park) position. The line labeled "engine speed" corresponds to a speed of an engine associated with automatic transmission 10, e.g., coupled to impeller 42 of torque converter 40. As may be seen in FIG. 4, the engine speed may be substantially constant during method 300. The line labeled "turbine speed" corresponds to a measured speed of turbine 44 of torque converter 40, e.g., or input shaft 12. The turbine speed may be measured with input speed sensor 30.

At step 310, a shift lever of a vehicle associated with automatic transmission 10 is shifted or adjusted to a neutral position (commonly indicated with an "N") or a park position (commonly indicated with a "P"). As an example, a driver of the associated vehicle may adjust the shift lever to the neutral position or the park position at step 310. In particular, the driver may adjust the shift lever from a drive position (commonly indicated with a "D") or a reverse position (commonly indicated with an "R") to the neutral position or the park position at step 310. Thus, the shift lever may be in the drive position or the reverse position before step 310. When the shift lever is in the neutral position or the park position, power flow from automatic transmission 10 is terminated or interrupted, e.g., such that output shaft 14 is not urged to rotate with power from automatic transmission 10.

At step 320, a shifting element of automatic transmission 10, such as dog clutch F, is commanded to actuate from the engaged configuration to the disengaged configuration. In particular, the shifting element of automatic transmission 10 may be commanded to the disengaged configuration after the shift lever is adjusted to the neutral position or the park position at step 310. Actuating the shifting element of automatic transmission 10 to the disengaged configuration may assist with terminating or interrupting power flow from automatic transmission 10. Any suitable shifting element of automatic transmission 10 may be commanded to the disengaged configuration at step 320. In particular, any suitable one or combination of dog clutch A, multidisc clutch B, multidisc brake C, multidisc brake D, multidisc clutch E, and dog clutch F may be commanded to the disengaged configuration at step 320. Electronic control unit 28 may command the shifting element of automatic transmission 10 to the disengaged configuration at step 320, e.g., by adjusting a solenoid valve of the shifting element in order to decrease the pressure of fluid supplied to the shifting element.

At step 330, an input speed of automatic transmission 10 is measured, e.g., during step 320. As an example, electronic control unit 28 may receive speed measurements of input shaft 12 from input speed sensor 30 to measure the input speed of automatic transmission 10 at step 330. As another example, input speed sensor 30 may be positioned at or adjacent turbine 44 of torque converter 40 such that electronic control unit 28 receives speed measurements of turbine 44 from input speed sensor 30 to measure the input speed of automatic transmission 10 at step 330. As may be seen in FIG. 4, the input speed of automatic transmission 10 may start at zero during method 300 and increase over time, e.g., as oil from impeller 42 begins to rotate turbine 44.

At step 340, a launch time for turbine 44 of torque converter 40 is established, e.g., based at least in part on when the input speed of automatic transmission 10 exceeds zero at step 330. As an example, the launch time may correspond to a time when a speed of turbine 44 exceeds zero during step 330. Thus, electronic control unit 28 may establish the launch time for turbine 44 of torque converter 40 when measurements of the speed of turbine 44 from input speed sensor 30 exceed zero at step 330.

At step 350, the launch time is compared to a target time T1. The target time T1 may be any suitable time. For example, the target time T1 may be established during manufacturing or testing or automatic transmission 10 and may correspond to a desired time for the input speed of automatic transmission 10 to exceed zero during disengagement of the shift element of automatic transmission 10. Thus, the target time T1 may be established empirically, in certain exemplary embodiments. The target time T1 may be any suitable time interval. For example, the target time T1 may correspond to a target elapsed time from a start of step 320 that provides a desired disengagement of the shifting element of automatic transmission 10 during step 320. The target time T1 may be saved within a memory of electronic control unit 28 of automatic transmission 10.

If the launch time is about (e.g., within five percent of) equal to the target time T1 at step 350, the shifting element of automatic transmission 10 is operating in the desired manner, and method 300 may be ended. Conversely, if the launch time is not about equal to the target time T1 at step 350, a command pressure to the shifting element of automatic transmission 10 is adjusted at step 360. The command pressure to the shifting element of automatic transmission 10 may be adjusted at step 360 based at least in part on the launch time for the turbine 44 of torque converter 40 established at step 340.

Step 360 is discussed in greater detail with reference to FIG. 4. As may be seen in FIG. 4, the turbine speed approaches the engine speed over time after the shift lever is adjusted to the neutral position or the park position at step 310. Due to variability within the shift element of automatic transmission 10, e.g., over time, the launch point of the shift element may vary or change. For example, the launch time may be an early launch time T2, e.g., that occurs at a first time interval Δt1 before the target time T1. As another example, the launch time may be a late launch time T3, e.g., that occurs at a second time interval Δt2 after the target time T1. Utilizing method 300, the launch time of subsequent disengagements of the shifting element of automatic transmission 10 may be adjusted to the target time T1. As an example, electronic control unit 28 may alter the current supplied to a solenoid valve of dog clutch F in order to change the command pressure to dog clutch F to a desired command line pressure at step 360. The desired command line pressure may correspond to the command line pressure associated with the target time T1 in FIG. 4. As an example, electronic control unit 28 may increase the current to the solenoid valve of dog clutch F if the launch time for turbine 44 from step 340 is the early launch time T2. Conversely, electronic control unit 28 may decrease the current to the solenoid valve of dog clutch F if the launch time for turbine 44 from step 340 is the late launch time T3.

As may be seen in FIG. 4, when the launch time of turbine 44 is the early launch time T2, the command line pressure supplied to dog clutch F may be low relative to a target command line pressure TP. Conversely, when the launch time of turbine 44 is the late launch time T3, the command line pressure supplied to dog clutch F may be high relative to the target command line pressure TP. By increasing or decreasing the current to the solenoid valve of dog clutch F, the performance of dog clutch F during disengagement or opening of dog clutch F may be improved. In particular, method 300 may assist with providing a uniform and/or consistent command line pressure to dog clutch F during disengagement or opening of dog clutch F.

It should be understood that while method 300 is described in FIG. 4 in the context of dog clutch F, method 300 may be used to provide a uniform and/or consistent command line pressure to any suitable shifting element of automatic transmission 10, in alternative exemplary embodiments. For example, method 300 may be used to provide uniform and/or consistent command line pressure to any suitable one or combination of dog clutch A, multidisc clutch B, multidisc brake C, multidisc brake D, multidisc clutch E, and dog clutch F, in alternative exemplary embodiments. Thus, method 300 is not intended to be limited to any particular shifting element of automatic transmission 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an automatic transmission, comprising:
   adjusting a shift lever to a neutral position or a park position;
   commanding a shifting element of the automatic transmission to actuate from an engaged configuration to a disengaged configuration;
   measuring an input speed of the automatic transmission;
   establishing a launch time for a turbine of a torque converter of the automatic transmission based at least in part on when the input speed of the automatic transmission exceeds zero at said step of measuring; and
   changing a command pressure to the shifting element of the automatic transmission based at least in part on the launch time for the turbine of the torque converter from said step of establishing.

2. The method of claim 1, wherein the shift lever is in a drive position or a reverse position before said step of adjusting.

3. The method of claim 1, wherein said step of commanding comprises adjusting a current supplied to a solenoid valve of the shifting element.

4. The method of claim 3, wherein said step of adjusting comprises adjusting the current supplied to the solenoid valve in order to change the command pressure to the shifting element of the automatic transmission to a desired command pressure.

5. The method of claim 1, wherein said step of changing comprises increasing a current to a solenoid valve of the shifting element if the launch time for the turbine of the torque converter from said step of establishing is less than a target time or decreasing the current to the solenoid valve of the shifting element if the launch time for the turbine of the torque converter from said step of establishing is greater than the target time.

6. The method of claim 5, wherein the target time is a target elapsed time from a start of said step of adjusting.

7. The method of claim 1, wherein said step of measuring comprises measuring a speed of the turbine of the torque converter.

8. The method of claim 1, wherein the shifting element of the automatic transmission is a dog clutch.

9. The method of claim 8, wherein the automatic transmission is a nine-speed automatic transmission.

10. A method for operating an automatic transmission, comprising:
  disengaging a shifting element of the automatic transmission after a shift lever is adjusted to a neutral position or a park position;
  measuring a turbine speed of a torque converter of the automatic transmission during said step of disengaging; and
  adjusting a command pressure supplied to the shifting element of the automatic transmission based at least in part on a launch time of a turbine of the torque converter, the launch time corresponding to a time when the turbine speed exceeds zero during said step of measuring.

11. The method of claim 10, wherein the shift lever is in a drive position or a reverse position before said step of disengaging.

12. The method of claim 10, wherein said step of disengaging comprises adjusting a current supplied to a solenoid valve of the shifting element.

13. The method of claim 12, wherein said step of adjusting comprises adjusting the current supplied to the solenoid valve in order to adjust the command pressure to the shifting element of the automatic transmission to a desired command pressure.

14. The method of claim 10, wherein said step of adjusting comprises increasing a current to a solenoid valve of the shifting element if the launch time for the turbine of the torque converter is less than a target time or decreasing the current to the solenoid valve of the shifting element if the launch time for the turbine of the torque converter is greater than the target time.

15. The method of claim 14, wherein the target time is a target elapsed time from a start of said step of disengaging.

16. The method of claim 15, wherein the target time is saved within a memory of an electronic control unit of the automatic transmission.

17. The method of claim 10, wherein the shifting element of the automatic transmission is a dog clutch.

18. The method of claim 17, wherein the automatic transmission is a nine-speed automatic transmission.

19. A method for operating an automatic transmission, comprising:
  adjusting a shift lever to a neutral position or a park position;
  actuating a shifting element of the automatic transmission from an engaged configuration to a disengaged configuration after said step of adjusting;
  measuring an input speed of the automatic transmission; and
  step for adjusting a command pressure of the shifting element to a target command pressure based at least in part on the input speed of the automatic transmission.

* * * * *